US012565865B2

(12) United States Patent
Koci et al.

(10) Patent No.: US 12,565,865 B2
(45) Date of Patent: Mar. 3, 2026

(54) ENGINE HAVING HOTSPOT FUEL IGNITER AND PISTON AND METHODOLOGY USING SAME

(71) Applicant: Caterpillar Inc., Peoria, IL (US)

(72) Inventors: Chad P. Koci, Washington, IL (US); Dana R. Coldren, Secor, IL (US)

(73) Assignee: Caterpillar Inc., Peoria, IL (US)

( * ) Notice: Subject to any disclaimer, the term of this patent is extended or adjusted under 35 U.S.C. 154(b) by 92 days.

(21) Appl. No.: 18/585,190

(22) Filed: Feb. 23, 2024

(65) Prior Publication Data

US 2025/0270969 A1 Aug. 28, 2025

(51) Int. Cl.
*F02F 3/28* (2006.01)
*F02F 3/26* (2006.01)
*F02B 75/12* (2006.01)

(52) U.S. Cl.
CPC ................ *F02F 3/285* (2013.01); *F02F 3/26* (2013.01); *F02B 2075/125* (2013.01)

(58) Field of Classification Search
CPC ........ F02F 3/285; F02F 3/26; F02B 2075/125
See application file for complete search history.

(56) References Cited

U.S. PATENT DOCUMENTS

| | | | |
|---|---|---|---|
| 5,535,716 A | 7/1996 | Sato et al. | |
| 6,105,553 A | 8/2000 | Polach | |
| 6,276,334 B1 | 8/2001 | Cummins | |
| 7,281,514 B2 | 10/2007 | Hill et al. | |
| 7,832,370 B2 | 11/2010 | Sutherland et al. | |
| 8,025,046 B2 | 9/2011 | Petridis et al. | |
| 10,316,734 B2 * | 6/2019 | Svensson | F02B 23/0621 |
| 10,989,146 B2 | 4/2021 | Singh et al. | |
| 2015/0337793 A1 | 11/2015 | Storm et al. | |

FOREIGN PATENT DOCUMENTS

| | | | |
|---|---|---|---|
| JP | S61250376 A | 11/1986 | |
| WO | WO-2015132459 A1 * | 9/2015 | F02M 43/04 |

* cited by examiner

*Primary Examiner* — Mark L. Greene
(74) *Attorney, Agent, or Firm* — Brannon Sowers & Cracraft PC

(57) ABSTRACT

An engine includes a piston movable within a combustion cylinder, a direct fuel injector, and a hotspot fuel igniter. The hotspot fuel igniter includes a core exposed to the combustion cylinder, to ignite fuel spray plumes of a directly injected fuel, and an insulator insulating the core from heat transfer with a material of the piston. Applications include igniting a range of fuels, including lower cetane number fuels.

19 Claims, 3 Drawing Sheets

ENGINE HAVING HOTSPOT FUEL IGNITER AND PISTON AND METHODOLOGY USING SAME

TECHNICAL FIELD

The present disclosure relates generally to igniting fuel in an internal combustion engine, and more particularly to a hotspot fuel igniter strategy.

BACKGROUND

Internal combustion engines are well-known and widely used throughout the world for diverse purposes ranging from vehicle propulsion to operation of pumps, compressors, and electric power generation equipment. In a typical implementation, a fuel is admitted into a combustion cylinder and ignited with air to produce a rapid temperature and pressure rise in the cylinder that drives a piston coupled to a rotatable crankshaft. In some engine platforms, a fuel is mixed with incoming intake air and delivered in an at least partially premixed state into the cylinder. In other strategies a fuel is directly injected into the cylinder. Ignition strategies range from compression-ignition of the fuel, to ignition assisted by way of a glowplug or spark ignition, to prechamber ignition, corona discharge ignition, and still others.

In recent years there has been increased interest on the exploitation of so-called alternative fuels. While diesel, natural gas, and gasoline fuels, as well as combinations and variations of these, have all performed well for over a century, there is a present desire to operate engines with reduced levels of certain emissions produced by burning traditional fuels, including particulates, oxides of nitrogen, and so-called greenhouse gases. Alternative fuels have been the subject of considerable research but often still fail to reach their full theoretical potential in commercial applications. One factor limiting optimal utilization of certain fuels relates to a relative difficulty that can be observed in achieving ignition, or at least ignition and subsequent combustion according to desired operating strategies. U.S. Pat. No. 10,989,146B2 to Singh et al. is directed to a system and method proposing to introduce oil droplets into a combustion chamber of a lean born natural gas engine to provide multiple distributed sources of ignition. The art provides ample justification for development of improvements and alternative strategies.

SUMMARY

In one aspect, an engine includes an engine housing having a cylinder block and a cylinder head, and having a combustion cylinder formed therein. The engine further includes a piston movable within the combustion cylinder, and a direct fuel injector extending into the combustion cylinder and including a plurality of spray orifices. The engine also includes a hotspot fuel igniter including a core exposed to the combustion cylinder, and an insulator extending at least partially around the core.

In another aspect, a piston includes a piston crown formed of a piston crown material, and including a piston crown surface forming an annular piston rim extending circumferentially around a piston center axis. The piston further includes a plurality of hotspot fuel igniters in the piston crown and each including a core positioned so as to be impinged by an attached flow of a fuel along the piston crown surface, and an insulator insulating the core from the piston crown material.

In still another aspect, a method of operating an engine includes directly injecting a fuel into a combustion cylinder in an engine, and impinging a plurality of plumes of the directly injected fuel upon a plurality of hotspot fuel igniters in a piston crown of a piston in a combustion cylinder and insulated from heat transfer with a material of the piston. The method still further includes igniting the plurality of plumes of the directly injected fuel based at least in part upon retained heat of the plurality of hotspot fuel igniters.

DETAILED DESCRIPTION

Figure 1:
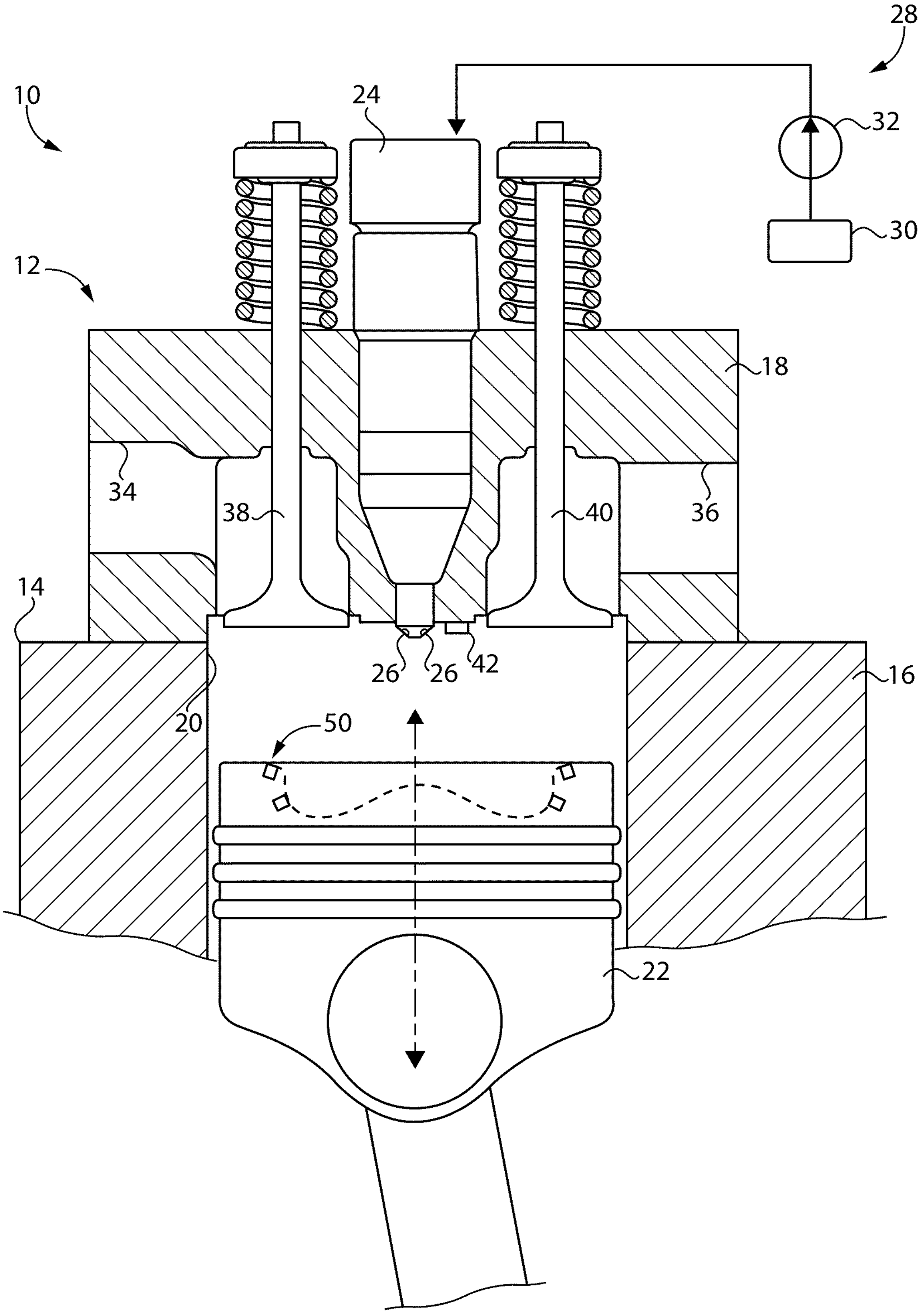
FIG. 1 is a sectioned diagrammatic view of an internal combustion engine system, according to one embodiment.

Referring to FIG. 1, there is shown an internal combustion engine system 10, according to one embodiment. Engine system 10 includes an internal combustion engine 12 having an engine housing 14. Engine housing 14 includes a cylinder block 16 and a cylinder head 18, and a combustion cylinder 20 formed therein. One combustion cylinder 20 is illustrated in FIG. 1. It will nevertheless be appreciated that engine 12 could include any number of combustion cylinders in any suitable arrangement, such as an inline pattern, a V-pattern, or still another. A piston 22 is movable without combustion cylinder 20 between a bottom-dead-center position and a top-dead-center position in a generally conventional manner. Example applications for engine system 10 include vehicle propulsion, such as in a land vehicle or a marine vessel, operation of a pump, a compressor, or various industrial equipment, as well as operation of electrical generator equipment to name a few examples.

Engine system 10 further includes a fuel system 28 having a fuel supply 30, a fuel pump 32, and a direct fuel injector 24 extending into combustion cylinder 20 and including a plurality of spray orifices 26. Fuel supply 30 may contain a range of fuels or fuel blends including liquid fuels such as methanol, ethanol, naptha, gasoline, or various hydrocarbon or hydrocarbon-derivative fuel blends. Fuel supply 30 might also include any of a variety of gaseous fuels such as natural gas, propane, methane, blends of various gaseous hydrocarbon fuels, or fuels containing gaseous molecular hydrogen. In an implementation the fuel utilized in engine system 10 may include a lower cetane number fuel, including a fuel having a cetane number from approximately 30 to approximately 50, and in some embodiments a fuel having a cetane number of about 35 or less. As used herein, the term "about" means generally or approximately, as would be understood by a person of ordinary skill in the art including but not necessarily limited to within measurement error.

Cylinder head 18 may further include an intake port 34 and an exhaust port 36. An intake valve 38 is shown movable to control fluid communication between intake port 34 and combustion cylinder 20. An exhaust valve 40 controls fluid communication between exhaust port 36 and combustion cylinder 20. In a typical implementation, two intake valves and two exhaust valves will be generally conventionally used. Engine system 10 may be operated in a four-stroke engine cycle, although the present disclosure is not strictly limited as such. Engine system 10 also includes an ignition aid 42 that is positioned at least partially in combustion cylinder 20. In one embodiment, ignition aid includes a glowplug having a resistive electric heater. In another implementation ignition aid 32 includes a sparkplug forming a spark gap within combustion cylinder 20. In still another implementation ignition aid 42 could be a so-called prechamber ignition device having a dedicated supply of fuel to a prechamber therein that is fluidly connected to combustion cylinder 20. Still other embodiments might not include an ignition aid at all.

It will be recalled direct fuel injector 24 includes spray orifices 26 structured to spray plumes of a liquid fuel or a gaseous fuel into combustion cylinder 20. Spray orifices 26 can include any number, and direct fuel injector 24 can be operated in any suitable manner to perform the injection of fuel. For example, direct fuel injector 24 could be supplied with a fuel already pressurized to an injection pressure, and an electrically and/or hydraulically actuated fuel injection valve in fuel injector 24 operated to control fuel injection timing. In other instances, direct fuel injector 24 could be cam-actuated to pressurized a fuel for injection, or could include a hydraulically actuated fuel pressurization plunger according to a variety of known strategies.

As suggested above, certain engine systems have been observed to be challenging to optimally operate utilizing certain fuels. According to the present disclosure, specialized ignition apparatus may be utilized in combustion cylinder 20 to ignite or assist in ignition of directly injected fuel including by causing or enhancing compression-ignition. In the FIG. 1 illustration, piston 22 includes a hotspot fuel igniter 50, which will typically be one of a plurality of hotspot fuel igniters that are structured to interact with directly injected fuel spray plumes to achieve or improve ignition as further discussed herein.

Figure 2:
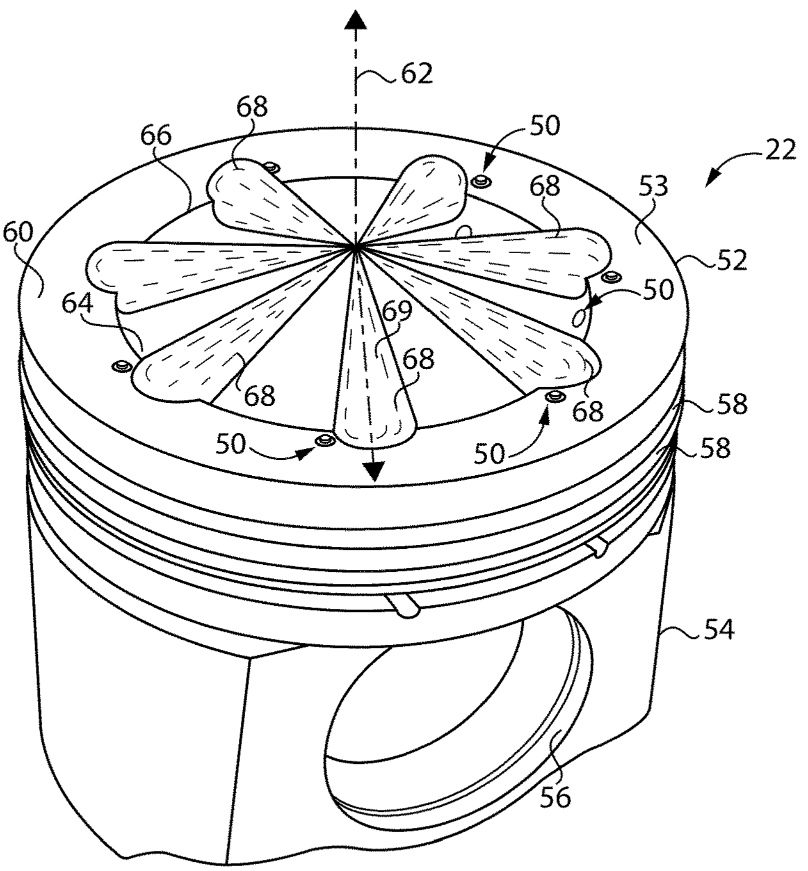
FIG. 2 is a perspective view of a piston in proximity to advancing fuel spray plumes, according to one embodiment.
Figure 3:
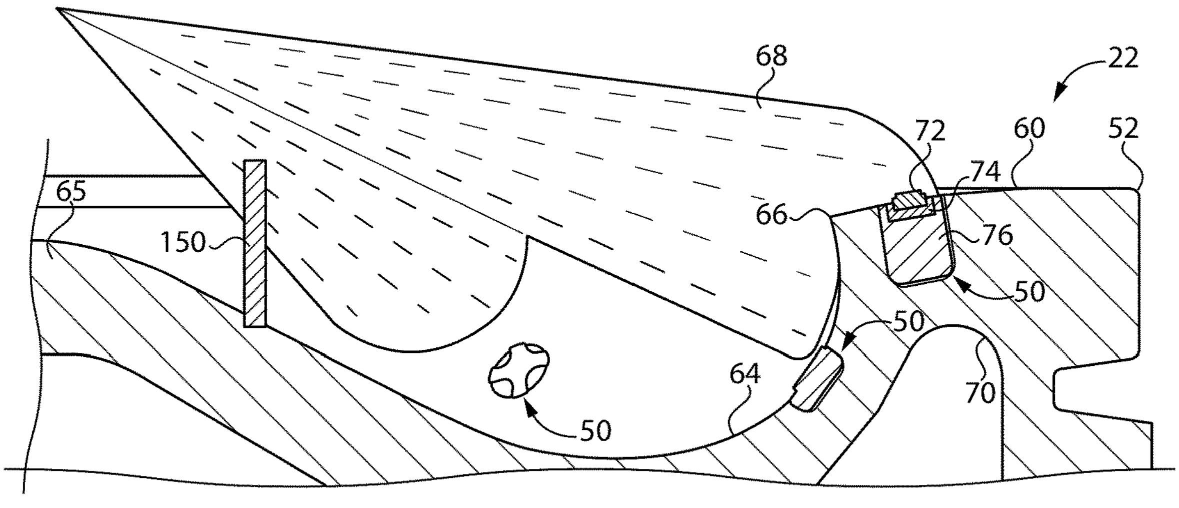
FIG. 3 is a sectioned view of a portion of the piston and fuel spray plumes as in FIG. 2.
Figure 4:
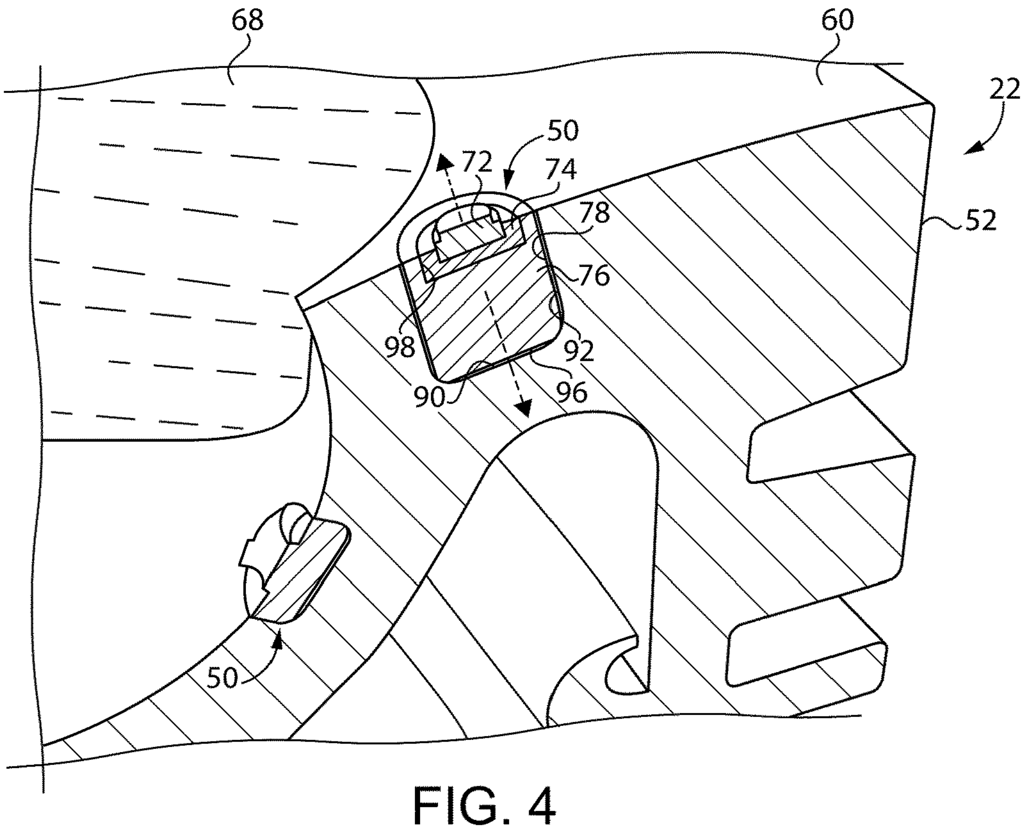
FIG. 4 is another sectioned view, in perspective, of a portion of a piston as in FIGS. 2 and 3.

Referring also now to FIG. 2, there is shown piston 22 as it might appear where a plurality of fuel spray plumes 68 have been directly injected into combustion cylinder 20. Piston 22 includes a piston crown 52 formed of a piston crown material such as an iron or a steel, and including a piston crown surface 53. Piston crown surface 53 forms an annular piston rim 60 extending circumferentially around a piston center axis 62. Piston 22 also includes a piston skirt 54 attached to piston crown 52 and having formed therein a wrist pin bore 56. A plurality of piston ring grooves 58 may be formed in piston crown 52 in a generally conventional manner. In the illustrated embodiment, annular piston rim 60 extends circumferentially around a combustion bowl 64. Combustion bowl 64 may include a centrally located cone 65. A bowl edge is shown at 66 and may define a radius of curvature smallest among all radiuses of curvature defined by piston crown surface 53. As best seen in FIGS. 3 and 4 an oil gallery surface 70 is also formed in piston crown 52 and forms an oil gallery supplied with cooling oil sprayed at an underside of piston 22 in a generally known manner. Oil gallery surface 70 may be located at a consistent wall thickness distance from surfaces forming combustion bowl 64 circumferentially around piston center axis 62.

Figure 5:
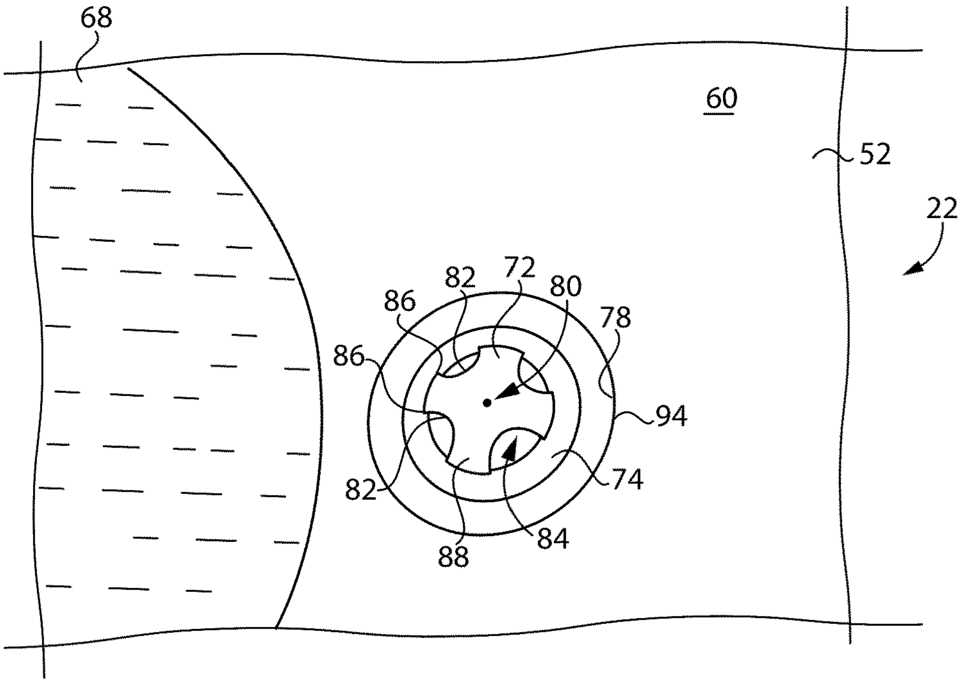
FIG. 5 is a top view of a piston as in FIGS. 2-4.

Referring also now to FIGS. 3-5, there are shown features of hotspot fuel igniter 50, including a plurality of hotspot fuel igniters 50, in further detail. At least some of hotspot fuel igniters 50 are interchangeable with one another. Each hotspot fuel igniter 50, referred to, at times, hereinafter in the singular, includes a core 72 exposed to combustion cylinder 20. Core 72 may be mounted in piston crown 52 and positioned so as to be impinged by an attached flow of a fuel, for example a fuel spray plume 68, advancing along piston crown surface 53. An "attached" plume of fuel can be understood as a flow of atomized and vaporizing liquid fuel, or a gaseous fuel, in contact with piston crown surface 53.

Hotspot fuel igniter 50 may further include a plug 76, and an insulator 74 extending at least partially around core 72. In the illustrated embodiment insulator 74 extends between core 72 and plug 76. Insulator 74 may be a solid phase insulator, such as a ceramic or other non-metallic material, or a cermet or other composite material, insulating core 72 from heat transfer with the piston crown material. Also in the illustrated embodiment, an air gap clearance is defined between hotspot fuel igniter 50 and the piston material of piston 22. The subject air gap clearance may include an axial air gap clearance 90 and a radial air gap clearance 92. The terms "axial" and "radial" are understood relative to a plug axis 80 defined by plug 76. Hotspot fuel igniter 50 may be attached to piston crown 52, such as by interference-fitting within a bore 78 extending inwardly into piston crown 52 from piston crown surface 53.

Focusing now on FIG. 5, it can be seen that core 72 includes a fuel-impingement edge 82, potentially one of a plurality of fuel-impingement edges 82. Fuel-impingement edges 82 may include surfaces extending generally in an axial direction parallel to plug axis 80. The present disclosure is not limited as such, however, and fuel-impingement edges 82 might be oriented transverse to plug axis 80, approaching plug axis 80 in an axially outward direction or divergent from plug axis 80 in an axially outward direction, for example. Also in the illustrated embodiment fuel impingement edges 82 may have generally arcuate shapes and are distributed circumferentially around plug axis 80 so as to form a plurality of pockets 84 in an alternating arrangement with a plurality of radial arms 88. Radial arms 88 and pockets 84 may intersect at a plurality of corners 86. A variety of other configurations and geometries of a fuel-impingement edge are contemplated herein. It is generally desirable that a fuel-impingement edge according to the present disclosure is capable of being impinged by a fuel spray plume and promoting mixing and/or eddying of the fuel spray plume.

As can also be seen from FIG. 5, plug 76 may include an outer surface 94. Outer surface 94 may traverse a generally cylindrical path around plug axis 80, but may itself be non-cylindrical at least at certain locations so as to form air gap clearance 92. As noted above, an axial air gap clearance 90 may also be defined between plug 76 and piston crown 52, thus a lower surface 96 of plug 76 may be non-planar. Core 72 and insulator 74 may be received in a recess 98 formed in plug 76.

As noted previously, hotspot fuel igniter 50 may ignite or assist in igniting a fuel in a spray plume of fuel. The promotion of ignition by hotspot fuel igniter 50 may occur based on retained heat of core 72. During combustion, a piston crown will often be the hottest part of the overall combustion chamber. It is contemplated that by insulating hotspot fuel igniter 50 from material of piston crown 52, cooling of core 72 as compared to material of piston crown 52 may be reduced. Put differently, core 72 may cool less during an engine cycle than other parts of piston 22, and thus retain more heat generated by the combustion of fuel than other parts of piston 22. By selective placement of one or more hotspot fuel igniters in piston 22, the retained heat can promote ignition over what might be otherwise observed, including compression-ignition of certain lower cetane fuels as discussed above.

Returning focus to FIG. 2, it will be appreciated that spray orifices 26 of fuel injector 24 may define generally define paths of fuel spray plumes 68 through space. Accordingly, each of fuel spray plumes 68 can be understood to define a fuel spray axis through combustion cylinder 20. Hotspot fuel igniter 50 may be one of a plurality of hotspot fuel igniters arranged in a regular pattern relative to the plurality of fuel spray axes. One of fuel spray plumes 68 is illustrated defining a fuel spray axis 69. The regular pattern of the plurality of hotspot fuel igniters 50 may include an angularly offset pattern, circumferentially around piston center axis 62. Thus, as can be seen from FIG. 2 fuel spray axis 69 is not pointed directly at the nearest hotspot fuel igniter 50 but is instead somewhat angularly offset. As a result, fuel spray plumes 68 advancing outwardly from fuel injector 24 may impinge upon combustion bowl edge 66 and then spread downwardly into combustion bowl 64 but also circumferentially around and along annular piston rim 60 and impinge upon hotspot fuel igniters 50.

Looking again to FIG. 3, it can be appreciated that the plurality of hotspot fuel igniters 50 includes hotspot fuel igniters 50 within annular piston rim 60 and also hotspot fuel igniters 50 within combustion bowl 64. Hotspot fuel igniters 50 within combustion bowl 64 may be positioned in bores in piston crown 52 that are relatively shallower as compared to hotspot fuel igniters 50 positioned in annular piston from 60. FIG. 3 also illustrates an upwardly extending hotspot fuel igniter 150 that is positioned relatively closer to center cone 65 and projects upwardly into one of fuel spray plumes 68. Those skilled in the art will envision various further combinations and modifications to the presently disclosed embodiments with respect to arrangement, type, and other properties of hotspot fuel igniters 50, 150.

INDUSTRIAL APPLICABILITY

Referring to the drawings generally, as explained above engine system 10 can be operated in an engine cycle whereby piston 22 moves up and down in combustion cylinder 20, intake and exhaust valves 38 and 40 are opened and closed at appropriate timings, and fuel is injected by way of fuel injector 24 to produce a plurality of fuel spray plumes. Movement of piston 22 toward a top-dead-center position increases pressure in combustion cylinder 20 toward an autoignition threshold of the injected fuel. Injection of the fuel may take place before, at, or after a top-dead-center position of piston 22 but will typically occur when piston 22 is closer to top-dead-center than to bottom-dead-center in an engine cycle. As the fuel spray plumes advance outwardly and impinge upon hot spot fuel igniters 50,150, the retained heat of combustion of cores 72 can assist in heating the fuel and, in conjunction with the perturbation to the flow of the fuel by impingement upon fuel-impingement edges 82, cause ignition to occur. As will be apparent from the present disclosure, multiple points of compression-ignition of the fuel can occur corresponding generally to the plurality of locations of hotspot fuel igniters 50,150 in combustion cylinder 20.

When engine system 10 is started from a cold start condition it may be desirable or necessary to utilize ignition aid 42, assisting in achieving ignition or at least consistent ignition of the injected fuel. As engine system 10 warms up and more heat from combustion is retained in hotspot fuel igniters 50, 150, variability in ignition cycle to cycle may lessen to the point that ignition aid 42 is not required at all.

The present disclosure can be implemented as original equipment in a new engine to be placed in service. It is also contemplated that pistons, or even potentially other engine apparatus, can be provided as an aftermarket part or retrofit kit to be installed in an existing engine, such as an engine which is desired to transition to operation on a different fuel type. In an example, a diesel engine could be modified to operate on an alternative fuel type such as an alcohol fuel, and equipped according to the present disclosure with hotspot fuel igniters. Still other applications contemplate sale of loose hotspot fuel igniters themselves such as in a kit whereby existing pistons or other engine apparatus can be appropriately modified and equipped.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An engine comprising:

an engine housing including a cylinder block and a cylinder head, and having a combustion cylinder formed therein;

a piston movable within the combustion cylinder;

a direct fuel injector extending into the combustion cylinder and including a plurality of spray orifices; and a hotspot fuel igniter within the piston including a core exposed to the combustion cylinder, and an insulator extending at least partially around the core.

2. The engine of claim 1 further comprising an ignition aid supported in the cylinder head.

3. The engine of claim 1 wherein the hotspot fuel igniter further includes a plug, and the insulator extends between the core and the plug.

4. The engine of claim 1 wherein the core includes a fuel-impingement edge.

5. The engine of claim 1 wherein an air gap clearance is defined between the hotspot fuel igniter and a material of the piston.

6. The engine of claim 1 wherein the plurality of spray orifices define a plurality of fuel spray axes through the combustion cylinder, and the hotspot fuel igniter is one of a plurality of hotspot fuel igniters arranged in a regular pattern relative to the plurality of fuel spray axes.

7. The engine of claim 6 wherein the regular pattern includes an angularly offset pattern relative to the plurality of fuel spray axes, circumferentially around a piston center axis.

8. The engine of claim 1 wherein the piston includes an annular piston rim extending circumferentially around a combustion bowl, and the hotspot fuel igniter is attached to the annular piston rim.

9. A piston comprising:

a piston crown formed of a piston crown material, and including a piston crown surface forming an annular piston rim extending circumferentially around a piston center axis; and a plurality of hotspot fuel igniters mounted in the piston crown and each including a core positioned so as to be impinged by an attached flow of a fuel along the piston crown surface, and an insulator insulating the core from the piston crown material.

10. The piston of claim 9 wherein each respective core includes a fuel-impingement edge.

11. The piston of claim 10 wherein each fuel-impingement edge is one of a plurality of fuel-impingement edges of each respective hotspot fuel igniter.

12. The piston of claim 10 wherein the plurality of hotspot fuel igniters each include a plug positioned in a bore in the piston crown and supporting the respective core.

13. The piston of claim 12 wherein an air gap clearance is defined between each respective plug and the piston crown.

14. The piston of claim 13 wherein each respective plug defines a plug axis, and the air gap clearance includes an axial air gap clearance and a radial air gap clearance.

15. The piston of claim 13 wherein the insulator includes a solid phase insulator between the respective plug and core.

16. The piston of claim 9 wherein the annular piston rim extends circumferentially around a combustion bowl, and the plurality of hotspot fuel igniters includes hotspot fuel igniters within the annular piston rim and hotspot fuel igniters within the combustion bowl.

17. A method of operating an engine comprising:

directly injecting a fuel into a combustion cylinder in an engine;

impinging a plurality of plumes of the directly injected fuel upon a plurality of hotspot fuel igniters in a piston crown of a piston in the combustion cylinder and insulated from heat transfer with a material of the piston; and igniting the plurality of plumes of the directly injected fuel based at least in part upon retained heat of the plurality of hotspot fuel igniters.

18. The method of claim 17 wherein the impinging a plurality of plumes includes impinging the plurality of plumes upon a fuel-impingement edge of each respective one of the plurality of hotspot fuel igniters exposed to an attached flow of one of the plurality of plumes along a piston crown surface of the piston crown.

19. The method of claim 17 wherein the directly injected fuel includes a fuel having a cetane number below about 35.

* * * * *